Sept. 27, 1938.  S. JENCICK  2,131,476
WHEEL SUSPENSION DEVICE FOR AUTOMOBILES
Filed Nov. 15, 1934  2 Sheets-Sheet 1

INVENTOR.
STEPHEN JENCICK.
BY
ATTORNEYS.

Sept. 27, 1938.  S. JENCICK  2,131,476
WHEEL SUSPENSION DEVICE FOR AUTOMOBILES
Filed Nov. 15, 1934  2 Sheets-Sheet 2
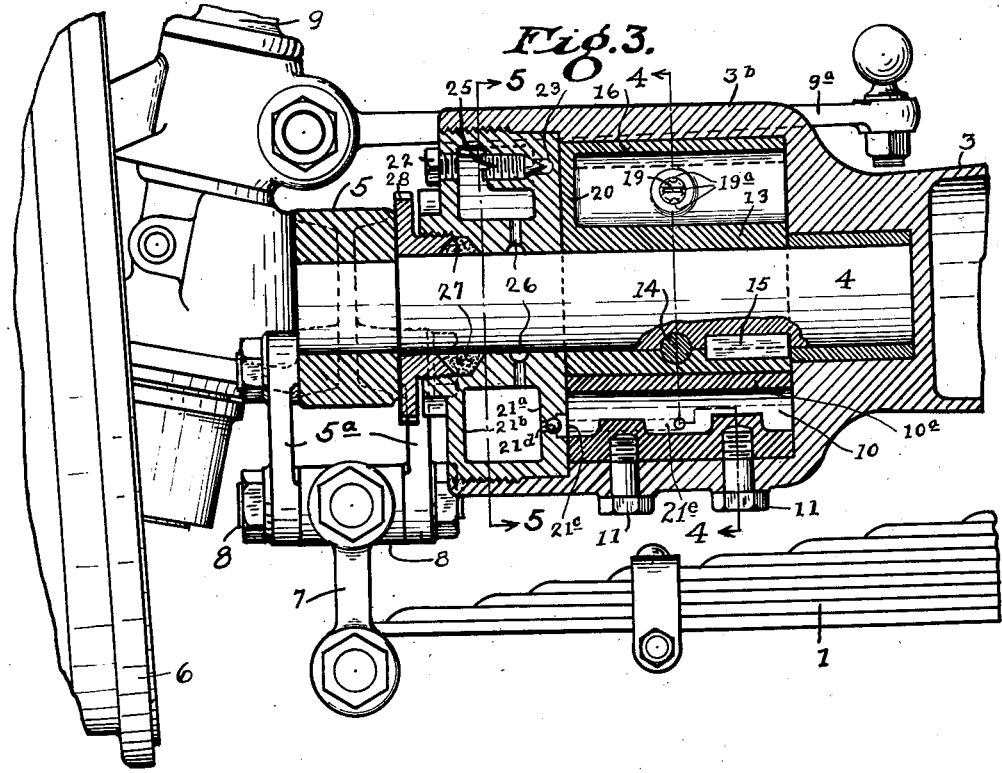
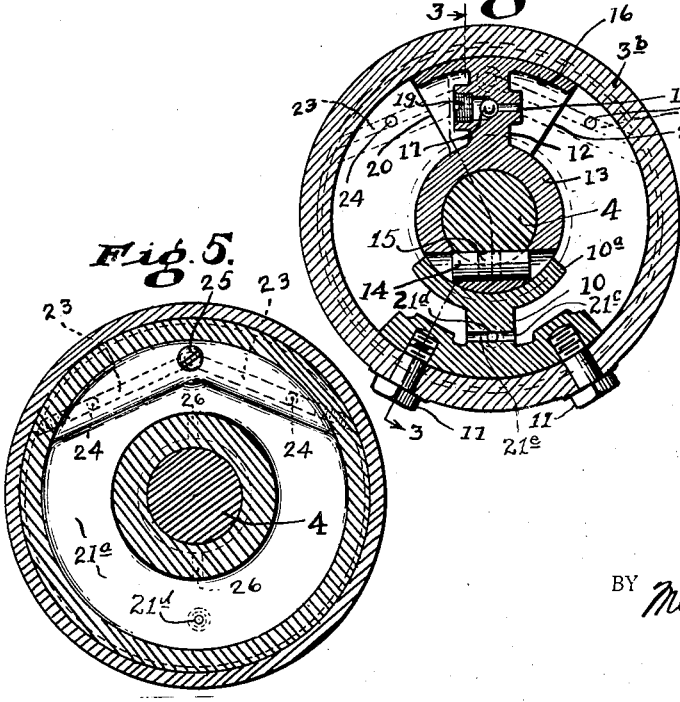
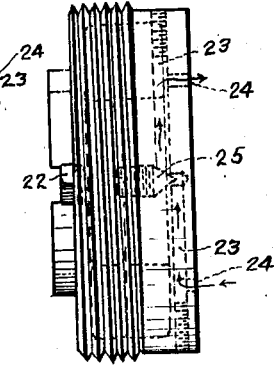
INVENTOR.
STEPHEN JENCICK.
BY Milburn and Milburn
ATTORNEYS.

Patented Sept. 27, 1938

2,131,476

UNITED STATES PATENT OFFICE 2,131,476

WHEEL SUSPENSION DEVICE FOR AUTOMOBILES

Stephen Jencick, Chagrin Falls, Ohio, assignor to Thompson Products, Inc., Cleveland, Ohio Application November 15, 1934, Serial No. 753,238

6 Claims. (Cl. 267—19)

This invention relates to the art of independently acting wheel-suspension devices for automobiles, and this application is closely related to a companion application executed of even date herewith, now Patent No. 2,079,290, dated May 4, 1937.

The purpose of this invention is to provide such a device which is of comparatively simple structure and which at the same time is highly efficient and dependable and not apt to get out of order.

Another object is to devise an improved combination of such a device and a shock absorber means, in which there is a highly efficient and advantageous structural arrangement and co-ordination between the parts which comprise this combination.

A further object is to devise such a combination of wheel-suspension means and shock-absorbing means that is comparatively inexpensive and that can therefore be adopted in the less costly automobiles.

Other objects will appear from the following description and claims when considered together with the accompanying drawings.

Fig. 3 is an enlarged sectional view of a part of Fig. 1 and corresponds to line 3—3 of Fig. 4;

Figure 1:
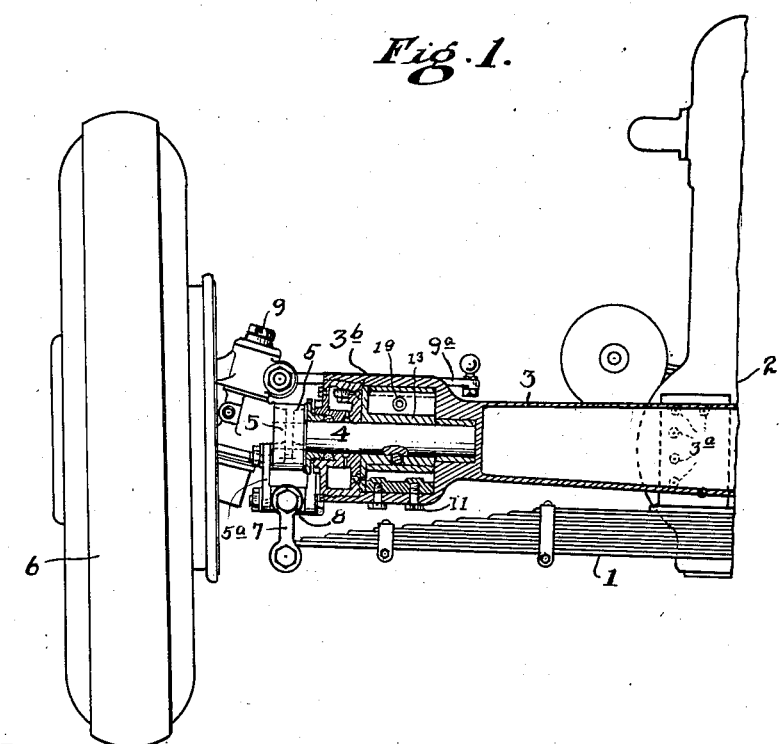
Fig. 1 is a view corresponding to line 1—1 of Fig. 2.
Figure 2:
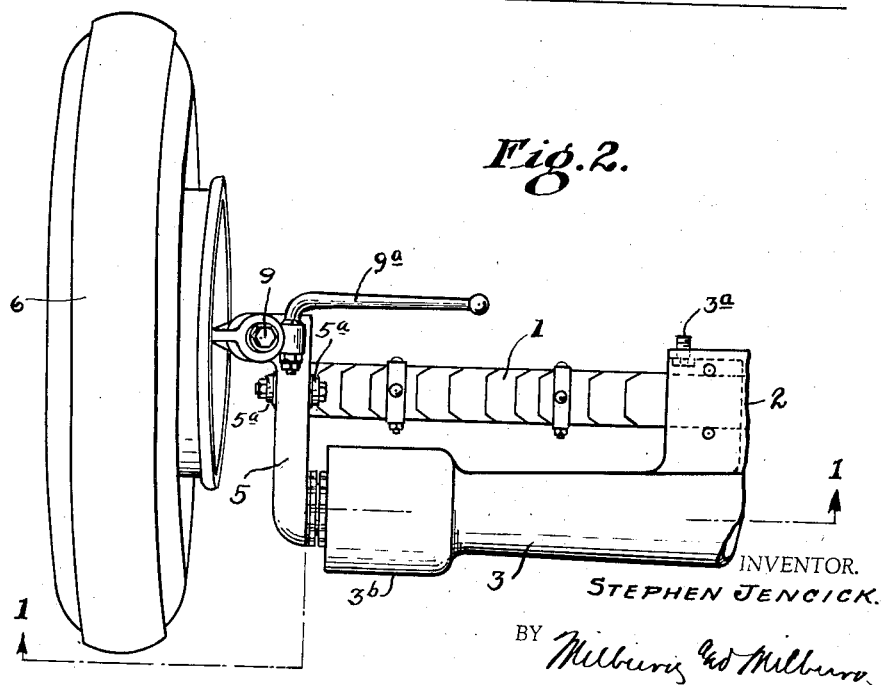
Fig. 2 is a top plan view of the same.

Figs. 4 and 5 are sectional views corresponding to lines 4—4 and 5—5, respectively, of Fig. 3; and Fig. 6 is an elevation of the oil reservoir alone.

It is to be understood that the present disclosure is merely for purposes of illustration and that various other modifications may be made without departing from the spirit of the present invention as herein set forth and claimed.

In the present application, there is illustrated my invention adapted for use in connection with the front wheels of an automobile, while in my companion application above referred to, I have illustrated a form of invention for use in connection with the rear wheels of an automobile.

Referring to the accompanying drawings, it is to be understood that the same structure as herein illustrated is intended to be employed in connection with both of the front wheels.

The same transversely disposed multiple leaf spring 1 is employed in connection with both of the devices for the front wheels, the one end portion of this spring being utilized with the device for the one front wheel, and the other end portion thereof being utilized with the device for the other front wheel. This spring is mounted at the middle thereof upon the chassis 2 in the manner already familiar to those who are acquainted with this art.

According to my invention, the automobile body is affixed directly to the chassis as will be understood.

Fixedly secured to the front end of the chassis by means of the bolts 3ª is the transversely extending bracket 3, the two end portions of which are of the same construction as herein indicated for the one end portion and form parts of the devices provided for the two front wheels.

With the above understanding, the description of the one device, as herein illustrated, will apply also to the duplicate device provided for the other front wheel.

The outer end portion of the bracket 3 is formed with a bearing for the inner end of the stub shaft 4 which is affixed to the forward end portion of the arm 5, upon the other end of which the wheel 6 is mounted. The stub shaft 4 extends co-axially of the bracket 3.

As indicated in the drawings, the bracket 3 extends substantially parallel with the spring 1 and is offset forwardly from the spring in a direction lengthwise of the automobile, the bracket 3 also extending in a plane above that of the spring 1.

The arm 5 extends at a right angle to the stub shaft 4 and thus extends longitudinally of the automobile and is adapted for movement about the axis of shaft 4 in a corresponding plane.

The rear end portion of the arm 5 is connected to the end of the leaf spring 1 by means of what might be considered a substantially universal connection. This multi-way pivotal connection comprises the pair of links 7 which are pivotally connected to the spring 1 and with respect to the companion joint members 8 which are pivotally mounted in the depending pair of links 5ª which in turn are pivotally connected to the end portion of the arm 5. Thus, the end of arm 5 has a multi-way pivotal connection with the end of spring 1, whereby there is obtained a co-ordination of the movements of the spring 1 and that of the arm 5. As will be readily understood, the end of spring 1 will describe a curved path of movement in a transverse plane while the curved path of movement of the end of arm 5 will be in a longitudinal plane with respect to the length of the automobile.

Moreover, by virtue of this multi-way connection, the wheel will move up and down only in a substantially vertical plane, as it encounters uneven places in the roadway, and without any appreciable movement of the wheel either forward or rearward.

The links 7 permit the wheel to remain at all times in a vertical plane in spite of the curved path described by the outer end of the spring 1. This is true whether the wheel encounters a depressed or raised portion in the roadway; that is, whether the end of the spring bends downwardly or upwardly. Such a downward movement of the end of the spring will be caused, for instance, by a depression in the roadway, while the spring end will be caused to bend upwardly by the rebound action.

The links $5^a$ permit the wheel to remain in the same relative position forwardly or rearwardly with respect to the body of the automobile, in spite of the fact that the forward end of the arm 5 describes a curved path above and below the horizontal as the arm 5 is moved up and down about the axis of its shaft 4.

Thus, the combined effect of the links $5^a$ and 7 will be to restrict the path of movement of the wheel to a straight, vertical line, so far as the action of the present device is concerned. Obviously, each wheel will act in the same manner and independently of the action of the other wheel at any given time.

The wheel is pivotally mounted on the arm 5 for purposes of steering, as indicated by reference numeral 9, and the usual form of steering means is provided, as indicated at $9^a$.

Combined with the wheel-suspension means above described, I have provided also a hydraulic shock absorber means which is embodied within the oscillatable connection between the shaft 4 and the bracket 3. For this purpose, the bracket 3 is formed with an enlarged hollow portion $3^b$ within which the shock absorber means is housed.

Fixedly mounted upon the inside of the hollow housing $3^b$ is the radially disposed partition wall member 10 which is bolted thereto, as indicated at 11. The wall member 10 is provided with a curved bearing portion $10^a$ which is concentric with respect to the axis of shaft 4, as will more fully appear.

The radially disposed plunger member 12 is provided with a collar portion 13 which is fixed about the shaft 4 by means of the locking pin 14. If so desired, a key 15 may also be provided for more securely locking these parts together against relative movement either rotatably or axially. The plunger 12 has a curved bearing portion 16 for engagement with the inner surface of the housing $3^b$. It is to be understood that the engagements between the parts as herein described are substantially leak-proof except for the passages indicated.

The plunger 12 is provided with a ball valve 17 for closing the passage 18 therethrough. The slotted screw plug 19 maintains the ball 17 within its chamber. Movement of the plunger 12 in one direction within the housing $3^b$ will cause the valve 17 to be opened by the force of the liquid which will then be forced through the passage 18; whereas, movement of the plunger 12 in the opposite direction will cause the ball 17 to close the passage 18 against the escape of the fluid in the chamber. This general type of hydraulic shock absorber is well known in the art, and oil may be employed in the same.

The slots $19^a$ in the side of the plug 19 permit passage of oil therethrough and may be of any number; at the same time this plug maintains the ball 17 within its chamber.

As indicated in Fig. 3, the plunger member as originally formed, is entirely open at its inner end and has a wall 20 of suitable form, as indicated in the drawings, to serve as a valve for further controlling the passage of oil from one side of the plunger to the other. The form of wall 20 will be determined by the consideration as to exactly when it should become effective. When assembled, the open end of the plunger member is closed by the inner end wall of the housing.

There is provided the hollow annular reservoir which has a central opening adapted to fit about the shaft 4. This annular member has screw thread engagement with the inner surface of the housing wall and serves as a closure for the end of the housing. This annular member is adapted to seat upon a shoulder formed upon the inside of the housing at the outer end of the plunger member. This annular reservoir holds the oil to be supplied to the shock-absorbing chamber, and may be identified as having an inner wall $21^a$ and an outer wall $21^b$. The outer wall has the plug 22 which may be removed for replenishing the supply of oil and also for another purpose to be referred to below. The oil may be supplied from the reservoir to the compression chamber by means of the opening 21 which is controlled by the ball valve $21^d$. Communicating passages $21^e$ are provided through partition wall member 10.

The inner wall $21^a$ is formed with the passages 23 which connect at their outer ends with the compression chambers upon the opposite sides of the plunger 12. For this purpose, the inner wall of the reservoir has the openings 24 which open into the plunger chambers at the ends of the passages 23. The oil will be permitted to pass through these openings and passages during a part of the movement of the plunger 12 in either direction; but in case of extreme movement, the openings 24 will be closed by the wall 20 so as to check further passage of the oil from one chamber to the other except for that permitted by leakage between the parts.

The screw threaded needle valve 25 is provided to regulate the amount of flow permitted through the passages 23, this valve being accessible for adjustment by removing the plug 22. This is the same plug closure which is removed for replenishing the supply of oil in the reservoir, as above explained.

The ducts 26 may be relied upon for automatically feeding oil from the reservoir to the shaft 4 for lubricating the same. If so desired, wicks may be provided in these ducts. Suitable packing 27 is provided between the reservoir and the shaft 4, together with the threaded packing member 28.

From the above, it will be seen that when a front wheel encounters a depression, the arm 5 will turn down about the axis of its shaft 4 while the spring 1 will bend downwardly. During this action, the links $5^a$ and 7 will be turned about their pivot points so as to permit the wheel to move along a straight line, as above explained.

During such downward straight-line movement of the wheel, as just described, the plunger 12 will be moved clockwise, as viewed in Fig. 4, and the oil will pass through the opening 18 and also through the passages 23, except in case the movement should be so severe as to finally close the corresponding opening 24, as above explained. This closing of the passages 23 results practically in a lock except for the escape of oil between the parts, and thus the severe shock from an extremely deep depression is avoided.

Then upon rebound or when the wheel encounters a raised portion in the road, the arm 5 will turn in the opposite direction, that is upwardly, about the axis of its shaft 4 and the spring 1 will also bend upwardly, and the plunger 12 will turn in the opposite direction, that is, counter-clockwise, as viewed in Fig. 4. Such movement of the plunger 12 causes the valve 17 to close and the passages 23 alone are open. Thus, during the rebound, there is more checking of the movement of the arm 5 and if such movement should be sufficiently severe and prolonged, there will be effected a substantial lock by closing the corresponding opening 24, as above explained.

Whether the arm 5 be turned downwardly or upwardly, the links 5ᵃ and 7 will function in the same way to prevent the bending of the spring and the turning of the arm 5 from interfering with the maintenance of the wheel in a straight, vertical path of up and down movement.

Thus, I have not only devised an improved and simplified form of wheel-suspension means, but I have also produced a direct and efficient co-ordination between the action of the wheel-suspension means and the shock-absorbing means. That is, in my combination, the shock-absorber not only serves as such but it also serves to govern the action of the wheel-suspension means throughout all its phases of operation. Instead of checking the downward and upward movements of the automobile body, as has been done in the past, the action of the spring is checked and controlled in the first instance without an opportunity to be transmitted to the body of the automobile. In this way, there is precluded any tendency towards unnecessary or extreme movement of the automobile body, and this applies to both of the front wheels in their individual movements. Thus, there is precluded any undesirable excess freedom of movement and there is eliminated the objectionable "galloping" action which is characteristic of certain modern popular types of automobiles in which the wheels are independently sprung, and which indicates an uncontrolled freedom of spring action. Consequently, with my improved combination, there is obtained a smoother riding condition of the automobile body under any and all road conditions.

Another advantage consists in the fact that the comparatively low cost of manufacture of my structure warrants its adoption in the low priced automobiles. This is due to simplicity of structure.

What I claim is:

1. In an automobile, the combination of a chassis, an outwardly extending bracket affixed thereto, spring means offset from said bracket in a direction lengthwise of the automobile, and a lever arm upon one end of which a wheel is mounted and which at its other end is mounted upon the inside of said bracket for oscillatable up and down movement in a vertical plane and which has direct substantially universal connection with said spring means so as to co-ordinate their movements, said lever arm extending in a longitudinal plane and shock absorber means of the oscillatable type arranged directly between said arm and bracket.

2. In an automobile, the combination of a chassis, bracket means affixed thereto, a unitary arm upon one end of which a wheel is individually carried and which at its other end is oscillatably mounted upon the inside of said bracket means for up and down movement in relation thereto, said arm extending in a longitudinal plane, individually acting shock absorber means arranged between the pivoted end of said arm and said chassis, and individually acting spring means arranged between the other end of said arm and said chassis.

3. In an automobile, the combination of a chassis, a laterally extending bracket affixed thereto, spring means supported upon said chassis and offset from said bracket in a direction lengthwise of the automobile and located below said bracket, a longitudinally disposed unitary arm upon which a wheel is mounted and which has oscillatable mounting upon the inside of said bracket for up and down movement in a vertical longitudinal plane and which has two-way link connection with said spring means so as to afford substantially universal joint action, and individually acting oscillatable shock absorber means arranged between said arm and chassis and adapted for operative movement concentrically with respect to the axis of oscillation of said arm.

4. In an automobile, the combination of a chassis, a laterally extending bracket affixed thereto and having a hollow end portion, spring means supported upon said chassis and offset from said bracket in a direction lengthwise of the automobile, a lever arm upon one end of which a wheel is carried, said arm being mounted at its other end within said bracket for oscillating movement in a vertical longitudinal plane and having substantially universal connection with said spring means so as to co-ordinate their movements, and an oscillatable hydraulic shock absorber of which the oscillatable connection between said arm and bracket forms a part, arranged within said bracket.

5. In an automobile, the combination of a chassis, an outwardly extending bracket affixed thereto and having a hollow end portion, spring means supported upon said chassis and offset from said bracket in a direction lengthwise of the automobile, a lever arm upon one end of which a wheel is carried, said arm being mounted at its other end within said bracket for oscillating movement in a vertical longitudinal plane and having substantially universal connection with said spring means so as to co-ordinate their movements, and an oscillatable hydraulic shock absorber of which the oscillatable connection between said arm and bracket forms a part, arranged within said bracket, said shock absorber comprising a radially disposed plunger carried by said arm and located within said bracket, a radially disposed partition provided upon the inside of said bracket and adapted for co-operation with said plunger, and means of communication between the opposite sides of said partition.

6. In an automobile, the combination of a chassis, an outwardly extending bracket affixed thereto and having a hollow end portion, spring means supported upon said chassis and offset from said bracket in a direction lengthwise of the automobile, a lever arm upon one end of which a wheel is carried, said arm being mounted at its other end within said bracket for oscillating movement in a vertical longitudinal plane and having substantially universal connection with said spring means so as to co-ordinate their movements, and an oscillatable hydraulic shock absorber of which the oscillatable connection between said arm and bracket forms a part, arranged within said bracket, said shock absorber comprising a radially disposed plunger carried by said arm and located within said bracket, a radially disposed partition provided upon the inside of said bracket and adapted for co-operation with said plunger, and means of communication between the opposite sides of said partition, and a reservoir arranged co-axially with respect to said oscillatable connection and having means of communication for the hydraulic medium to the chamber on one side of said partition, and means of communication between the chambers upon opposite sides of said partition.

STEPHEN JENCICK.